United States Patent
Petillon et al.

(10) Patent No.: US 8,543,281 B2
(45) Date of Patent: Sep. 24, 2013

(54) METHOD AND SYSTEM FOR ESTIMATING THE ANGULAR SPEED OF A MOBILE

(75) Inventors: Jean-Paul Petillon, Miramas (FR); Marc Salesse-Lavergne, Marseille (FR)

(73) Assignee: Eurocopter, Marignane Cedex (FR)

( * ) Notice: Subject to any disclaimer, the term of this patent is extended or adjusted under 35 U.S.C. 154(b) by 762 days.

(21) Appl. No.: 12/663,670

(22) PCT Filed: Jun. 9, 2008

(86) PCT No.: PCT/FR2008/000783
§ 371 (c)(1),
(2), (4) Date: Jun. 24, 2010

(87) PCT Pub. No.: WO2009/007530
PCT Pub. Date: Jan. 15, 2009

(65) Prior Publication Data
US 2010/0268414 A1     Oct. 21, 2010

(30) Foreign Application Priority Data
Jun. 8, 2007 (FR) ....................... 07 04096

(51) Int. Cl.
*G06F 7/00*        (2006.01)
(52) U.S. Cl.
USPC .............. 701/29.2; 701/5; 701/500; 701/501; 342/105; 342/104; 342/118; 342/357.3
(58) Field of Classification Search
USPC ............ 701/34, 29, 29.2, 500, 501; 342/104, 342/105, 118, 357.3
See application file for complete search history.

(56) References Cited

U.S. PATENT DOCUMENTS

| | | | |
|---|---|---|---|
| 3,824,386 A | 7/1974 | Offereins | |
| 4,254,465 A | 3/1981 | Land | |
| 4,601,206 A | 7/1986 | Watson | |
| 4,628,729 A | 12/1986 | Thoone | |
| 4,629,729 A | 12/1986 | Gatti | |
| 5,363,700 A | 11/1994 | Joly et al. | |
| 6,634,207 B1 * | 10/2003 | Lottman et al. | 73/1.78 |
| 6,912,464 B1 * | 6/2005 | Parker | 701/501 |
| 7,561,945 B2 * | 7/2009 | Giraudy et al. | 701/5 |
| 7,791,529 B2 * | 9/2010 | Filias et al. | 342/115 |

(Continued)

FOREIGN PATENT DOCUMENTS
EP        0170314 A1     2/1986
FR        2552222 A1     3/1985

OTHER PUBLICATIONS

Hung, et al., A Compensator to Advance Gyro-Free INS Precision, International Journal of Control, Automation, and Systems, 4(3): 351-358, Jun. 2006.
International Search Report mailed Mar. 5, 2009.

*Primary Examiner* — Thomas Black
*Assistant Examiner* — Wae Louie
(74) *Attorney, Agent, or Firm* — Brooks Kushman P.C.

(57) ABSTRACT

A method of determining an angular velocity of an aircraft includes measuring the angular velocity using at least one gyro delivering a measured angular velocity signal affected by stochastic noise; measuring the angular acceleration of the aircraft using at least one accelerometer delivering a signal representing the angular acceleration of the aircraft; and using a filtering complementary in a frequency domain to combine a sum of the measured angular velocity signal and the angular acceleration signal so as to obtain a hybrid estimated angular velocity signal with reduced stochastic noise.

14 Claims, 6 Drawing Sheets

(56) References Cited

U.S. PATENT DOCUMENTS 7,911,380 B2 * 3/2011 Petillon ...................... 342/357.3
2009/0278740 A1 * 11/2009 Petillon .................... 342/357.14
2010/0268414 A1 * 10/2010 Petillon et al. ................... 701/34
2011/0273324 A1 * 11/2011 Petillon ......................... 342/118

* cited by examiner

METHOD AND SYSTEM FOR ESTIMATING THE ANGULAR SPEED OF A MOBILE

This is a U.S. National Phase Application under 35 U.S.C. §371 of International Application PCT/FR2008/000783, filed on Jun. 9, 2008, which claims priority to French Application No. FR 07 04096, filed on Jun. 8, 2007. The International Application was published in French on Jan. 15, 2009 as WO 2009/007530 under PCT article 21 (2).

The present invention relates to a method and to a system for estimating the angular velocity of a moving body.

The technical field of the invention is that of fabricating autopilot systems on board aircraft.

The present invention relates in particular to a method and to a system of autopilot sensors that combine data resulting from measurements delivered by a plurality of sensors. In the meaning of the present application, unless specified explicitly to the contrary, the terms "measurement", "data", "signal", and their derivatives are considered as being equivalent, and likewise the terms "combined", "hybridized", and their derivatives, are considered as being equivalent.

BACKGROUND

The invention relates to inertial reference systems (IRS) and to attitude and heading reference systems (AHRS), in particular those based on rate gyros using microelectromechanical systems (MEMS) technology.

Controlling a moving body (e.g. an aircraft) requires inertial measurements to be taken relating to the six degrees of freedom of the moving body. As a general rule, these are usually firstly measurements of the three components of the angular velocity vector, and secondly of the three components of the angular acceleration vector.

Historically, angular measurements were initially made by means of free gyros, and subsequently they have been made by means of rate gyros that measure the angular velocity (rotation) components of the carrier directly.

Rate gyros include in particular so-called "strap-down" gyros (i.e. their axes of rotation are constrained to remain parallel to the axis of the carrier, with the applied force being proportional to angular velocity), laser gyros, optical fiber laser gyros, and resonating structure gyros.

In a resonating structure gyro, a mechanical resonator (such as a tuning fork) is caused to vibrate and its oscillations are sustained, with the movements thereof perpendicular to the excitation plane being measured. Coriolis forces tend to keep the vibration plane fixed in an inertial frame of reference, so such perpendicular components appear only in the presence of angular velocity and they are proportional to the amplitude thereof. That type of resonator can be miniaturized down to a scale of a MEMS made of silicon and located in an integrated circuit, thereby making it possible to fabricate a gyro at low cost.

Nevertheless, in such a gyro, since the resonating mass is extremely small, measurement noise is high. In a precision inertial unit, use is generally made of laser gyros having an intrinsic noise level that is of the order of 100th the noise level of a microsensor (of the MEMS type). It is known to incorporate angular accelerometers in a strap-down inertial unit in order to attempt to correct its deterministic errors (improperly referred to as "high frequency noise") as constituted by the cone and sculling effects that appear during dynamic stages of flight and in the event of computations being performed at too slow a rate or of the gyros having too narrow a passband. The amplitude of these errors is troublesome in navigation grade inertial units, but not for autopilot sensors, particularly since there is no longer a computation rate limitation given the power of modern computers.

These navigation grade gyros are laser rings of large size or possibly fiber optic gyros (FOGS), likewise of large size. Navigation applications are not accessible to MEMS inertial sensors. Rate gyros are essential sensors for an aircraft autopilot (below "AP"). It is possible to model a system including an aircraft 20 and it AP as shown in FIG. 2.

The main purpose of an AP is to stabilize the aircraft when faced with disturbances caused by turbulence in the mass of air. One way of modeling the effect of such turbulence is to represent it as a term 21 that is added to the movements of the flight control actuators 22.

Figure 2:
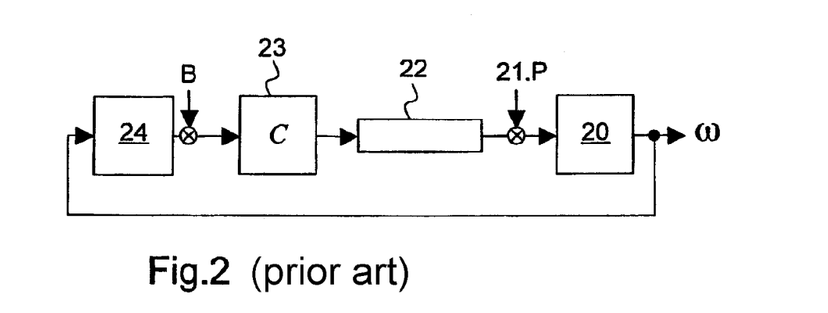
FIG. 2 is a diagram of the angular velocity stabilization loop of an aircraft.

The diagram of FIG. 2 serves to establish the following transfer function (where w is the actual angular velocity, P is the disturbance, B is the noise of the gyro 24, C is the gain of a correcting filter 23 for correcting gyro measurements, and where the transfer functions of the aircraft, of the actuator, and of the gyro are taken to be unity):

$$\omega = \begin{pmatrix} \frac{1}{1+C} & \frac{C}{1+C} \end{pmatrix} \begin{pmatrix} P \\ B \end{pmatrix}$$

Given the simplifications that are adopted, the corrector reduces to an integrator:

$$C = \frac{2\pi f_0}{p} = \frac{1}{\tau p}$$

where $f_0$ is the closed loop resonant frequency of the airplane with its autopilot. The transfer function then takes the form:

$$\omega = \begin{pmatrix} \frac{\tau p}{1+\tau p} & \frac{1}{1+\tau p} \end{pmatrix} \begin{pmatrix} P \\ B \end{pmatrix}$$

It can be seen that the system is complementary. It applies a highpass filter to the disturbances and a lowpass filter to the angular velocity measurement noise, using the same cutoff frequency. If the resonant frequency (i.e. the open loop gain) is increased to reject disturbances, then the bandwidth of the lowpass filter is increased in equal manner, thereby transmitting the sensor noise to the entire airplane.

When developing a helicopter AP fitted with FOGs that nevertheless present low measurement noise, the limiting factor on increasing the gain of the corrector is measurement noise, which is manifested by the appearance of broadband vibration felt by the crew. It is therefore measurement noise, even in high quality gyros, that limits the overall performance of the loop. Most present autopilots take advantage of the low noise of FOGs, in spite of their expense.

Figure 1:
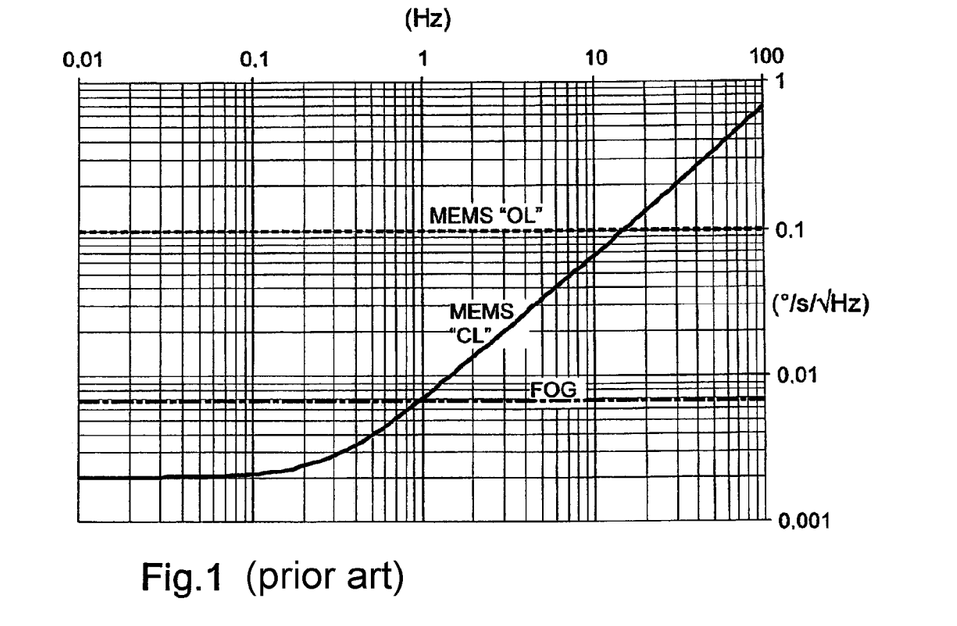
FIG. 1 is a diagram showing the appearance of the variation, as a function of frequency, in the PSD of the noise in three respective types of gyro.

The graph of FIG. 1 shows variations in spectral power density (PSD)—in degrees per second per square root of hertz (°/s/√Hz)—of the angular measurement noise respectively of a FOG, of a closed loop (CL) type MEMS, and of an open loop (OL) type MEMS, plotted up the ordinate as a function of frequency, plotted along the abscissa.

Given that the frequency band for an autopilot extends well beyond 1 hertz (Hz) (where the typical passband of a helicopter AP gyro is 10 Hz), and given the noise level of a FOG is the limiting criterion on improving an AP in terms of its response to turbulence, a MEMS gyro, even one of the closed loop type, presents a noise level that is excessive.

Furthermore, an "f" noise profile (i.e. a profile that increases in proportion to frequency) makes gain adjustment more sensitive: unlike a FOG in which noise amplitude increases with the square root of the passband, the noise level transmitted by the MEMS increases directly with frequency.

SUMMARY OF THE INVENTION

An aspect of the present invention is to reduce the "high frequency" measurement noise of a gyro (in particular at frequencies greater than one hertz).

The document "A compensator to advance gyro-free INS precision", Chao-Yu Hung et al., "International Journal of Control, Automation, and Systems", Vol. 4, No. 3, pp. 351-358, June 2006, proposes a gyro-free inertial navigation system having six linear accelerometers (axial accelerometers) oriented along and disposed on the edges of a regular tetrahedron (not constructed in full); purely and simply eliminating the gyros, with them being replaced by integrating angular acceleration measurements would require the linear accelerometers to present very great accuracy because of the way error in angular velocity estimated by integration diverges.

In an aircraft inertial unit, gyros are necessary to guarantee long-term stability (i.e. non-divergence) in the measured/estimated angular velocity. U.S. Pat. No. 3,824,386 and U.S. Pat. No. 4,254,465 propose using angular accerolometers to determine the angular velocity of the carrier.

Known angular accerolometers are constituted by a flywheel mounted on a shaft presenting elasticity in torsion. The torsion deflection is measured in order to deduce the angular acceleration therefrom. Such sensors are bulky and they are not suitable for being positioned in an aircraft. Miniature sensors (MEMS) used for regulating the speed of computer hard disk platters present sensitivity that is too small.

Patents EP 0 170 314 and U.S. Pat. No. 4,629,729 describe a device for determining angular position, which device includes an angular accelerometer serving to determine the high frequency components of a signal corresponding to the angle to be measured, together with an electrolytic sensor serving to determine the low frequency components of the signal.

Patents FR-2 552 222 and U.S. Pat. No. 4,601,206 describe using accelerometers to correct cone and sculling errors; proposals are made to use broadband accelerometers or to combine low frequency accelerometers with high frequency accelerometers.

The invention is defined by the claims.

An aspect of the invention is to propose an autopilot inertial system mounted, or suitable for mounting, on board an aircraft that is improved and/or that remedies the shortcomings or drawbacks of systems of that type, at least in part.

According to an embodiment of the invention, it is proposed to make use of miniature linear accelerometers, to combine and then integrate signals obtained from said accelerometers in order to produce calculated angular velocity signals, and to use complementary filtering in the frequency domain to combine the calculated angular velocity signals with angular velocity signals measured by gyros in order to obtain (estimated) hybrid angular velocity signals.

According to another embodiment of the invention, there is provided a method of determining the angular velocity of an aircraft, wherein the following steps are performed:

measuring the angular velocity by means of gyros delivering measured angular velocity signals $\vec{\omega}_m$;

measuring the angular acceleration of the aircraft by accelerometers delivering signals $\dot{\vec{\omega}}_m$ representative of the angular acceleration of the aircraft; and using filtering that is complementary in the frequency domain to combine the measured angular velocity signals and the measured angular acceleration signals so as to obtain hybrid angular velocity signals $\hat{\vec{\omega}}$.

In preferred implementations of the method of the invention:

the high frequencies of the measured angular velocity signals $\vec{\omega}_m$ are attenuated as are the low frequencies of the angular velocity signals obtained by integrating the angular acceleration;

in order to measure the angular acceleration of the aircraft, a cluster of at least six linear accelerometers is used (preferably single-axis or two-axis accelerometers), and three components of the angular acceleration of the aircraft are calculated as a function of at least six scalar acceleration measurements as delivered respectively by the linear accelerometers;

an excess (redundant) number of accelerometers is used and proper operation of the measurement and hybridizing system is monitored by comparing the innovation $\vec{\omega}_m - \hat{\vec{\omega}}$ with at least one reference value; it should be observed that in the vocabulary commonly used in the field of Kalman filters, the term "innovation" designates a difference such that $\vec{\omega}_m - \hat{\vec{\omega}}$ here designates an angular velocity difference; and a failure detection signal is produced when the reference value is exceeded for a plurality of successive cycles.

The invention can be implemented by a processor of a computer on board, or suitable for mounting on board, an aircraft, executing a program including instructions corresponding to the signal processing steps, including the filtering and the combining of the signals from the accelerometers and from the gyros.

Thus, a program including code usable by an aircraft computer for determining the angular velocity of the aircraft includes:

a first code segment for determining measured angular velocity data $\vec{\omega}_m$ of the aircraft from signals delivered by the gyro;

a second code segment for determining angular acceleration data $\dot{\vec{\omega}}_m$ of the aircraft from signals delivered by the accelerometers; and a third code segment for hybridizing the measured angular velocity data and the measured angular acceleration data, and for obtaining estimated angular velocity data $\hat{\vec{\omega}}$.

In another embodiment of the invention, there is provided a system for determining the angular velocity of an aircraft, the system comprising gyros that deliver measured angular velocity signals $\vec{\omega}_m$, and further comprising:

accelerometers delivering signals $\dot{\vec{\omega}}_m$ representative of the angular acceleration of the aircraft; and a hybridizing module coupled to the gyros and to the accelerometers to perform filtering that is complementary in the frequency domain, to combine the measured angular velocity signals and the measured angular acceleration signals and to obtain hybrid angular velocity signals $\hat{\vec{\omega}}$.

In preferred embodiments of the system of the invention:

the gyros present noise of power spectrum density that is substantially uniform at least in a frequency band going from about 0.1 Hz to about 10 Hz, or else noise of power spectrum density that is substantially proportional to the frequency, at least in a frequency band going from about 1 Hz to about 10 Hz;

the accelerometers present noise of power spectrum density that is substantially uniform, at least in a frequency band going from about 0.1 Hz to about 10 Hz;

the system includes at least six linear accelerometers that are rigidly secured to one another in a configuration presenting central symmetry, in particular at least six single-axis linear accelerometers spaced and oriented in a configuration in which the respective sensitive points of the accelerometers are located at the respective centers of the edges of a regular tetrahedron, and the respective sensitivity axes of the accelerometers are oriented along said edges;

in a variant, the system includes at least four two-axis linear accelerometers disposed at the vertices of a regular tetrahedron;

in another variant, the system includes at least three linear accelerometers placed in a trihedron and three angular accelerometers placed in a trihedron;

the gyros and/or accelerometers are essentially constituted by microelectromechanical systems;

the hybridizing module comprises a filter presenting proportional gain $1/\tau$, integral gain $1/\tau i$ that is low, i.e. $\tau \ll \tau i$, and a cutoff frequency of less than 1 Hz, in particular of the order of a few millihertz;

the hybridizing module includes a comparator arranged to compare the innovation $\vec{\omega}_m - \hat{\vec{\omega}}$ with a threshold, and failure confirmation logic connected to the comparator.

By means of the invention, the stochastic (non-deterministic) noise that is not correlated to the movements of the carrier and that affects the measurements of the gyros is reduced or eliminated by replacing the high frequency components of the gyro measurements by measurements taken from the angular accelerometers.

BRIEF DESCRIPTION OF THE DRAWINGS

Other aspects, characteristics, and advantages of the invention appear from the following description which reference to the accompanying drawings that illustrate preferred embodiments of the invention without any limiting character.

DETAILED DESCRIPTION

In accordance with an aspect of the invention, in order to reduce the high frequency noise that is troublesome for the autopilot system of an aircraft, the high frequency components of gyro measurements are attenuated, and the dynamic range lost in this way is restored by accelerometers that measure the derivative of the magnitude of interest, i.e. the angular velocity of the aircraft.

Figure 3:
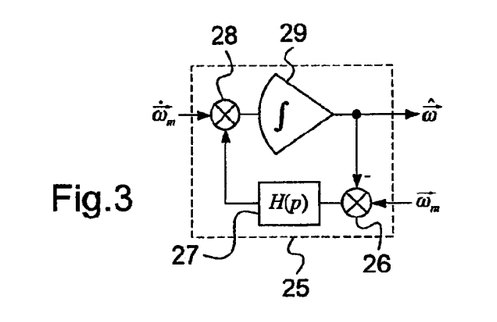
FIG. 3 is a block diagram of a hybridizing filter of a system of the invention.

For this purpose, and as shown in FIG. 3, a hybridizing filter 25 is used comprising:

a subtractor 26 receiving as input the angular velocity measurement signal $\vec{\omega}_m$ delivered by the gyro, and also the hybrid/estimated angular velocity $\hat{\vec{\omega}}$;

a filter 27 connected to the subtractor 26, receiving as input the innovation $\vec{\omega}_m - \hat{\vec{\omega}}$ produced by the subtractor 26, and outputting a bias correction, presenting characteristics that are described in detail;

a summing circuit 28 connected to the filter 27 and receiving as input the signal output by the filter together with the angular acceleration measurement $\dot{\vec{\omega}}_m$ as delivered by the angular accelerometer; and an integrator 29 connected to the summing circuit 28, receiving as its input the sum produced thereby, and delivering as its output the estimated angular velocity $\hat{\vec{\omega}}$.

When the angular accelerometer presents noise with uniform PSD (i.e. white noise), the angular velocity estimate that comes therefrom (by time integration) presents a so-called "1/f" noise spectrum distribution, which intersects the noise PSD of the gyro (which is "white" or "f"). It thus suffices to adjust the form and the cutoff frequency of the filter, i.e. the structure and the values of the coefficients of the filter H(p) shown in FIG. 3 so that it "selects" for each frequency band the better source: the accelerometer or the gyro.

Figure 4:
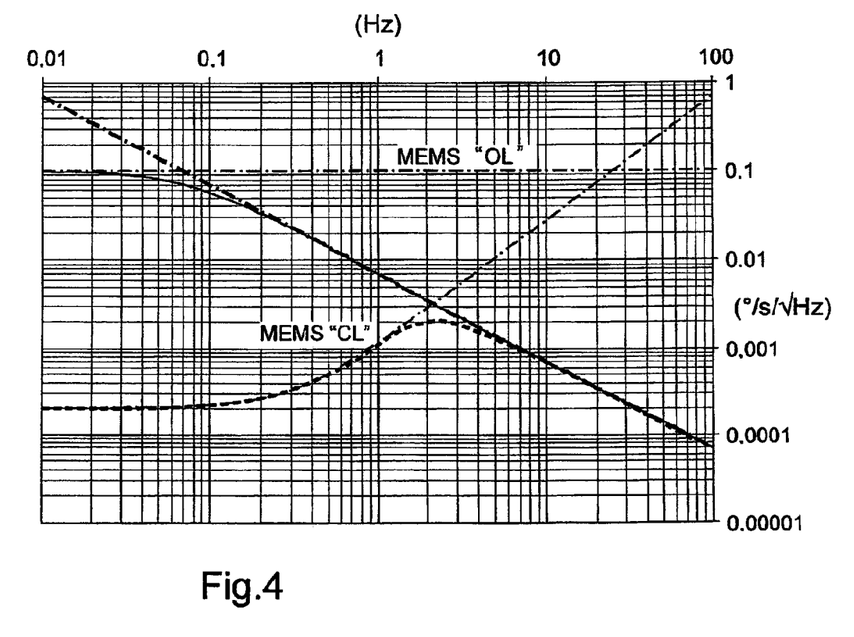
FIG. 4 is a diagram showing the appearance of the variation, as a function of frequency, in the PSD of the noise in two respective types of gyro, and also the time integral of an angular accelerometer, together with the noise that results from hybridizing the measurement, for each of the two gyros.

FIG. 4 plots the noise spectra respectively of an OL-MEMS gyro (reference 37), of the integral (reference 38) of a signal delivered an angular accelerometer, and also the noise spectrum 39 of the hybrid measurement that results from this first combination; the figure also shows the noise spectrum 43 of a CL-MEMS gyro and the noise spectrum 46 of the hybrid measurement that results from combining it with the accelerometer.

It is preferable to select an angular accelerometer presenting a noise level that is low enough for the intersection between the spectra to be located at as low a frequency as possible, so as to remove a maximum amount of noise from the gyro.

Alternatively, it is possible to use accelerometers having high noise levels by increasing the position difference between the sensors so as to increase the lever arm of the sensors relative to the center of rotation.

To measure all three components of the angular acceleration, it is possible in particular to make use of six single-axis linear accelerometers, or else four two-axis linear accelerometers, each combining two axial accelerometers.

Figure 5:
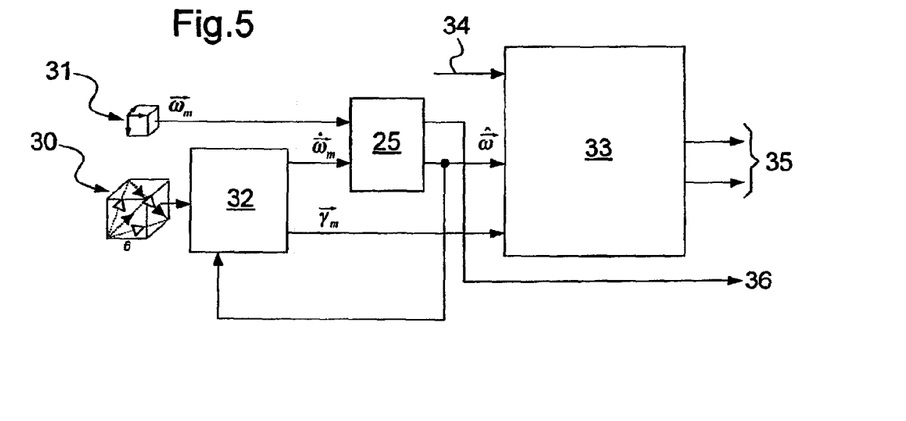
FIG. 5 is a block diagram of an embodiment of a system of the invention.

Typically, an AHRS type inertial sensor contains three gyros mounted as a trihedron, such as those referenced 31 in FIG. 5, and three linear accelerometers, likewise mounted as a trihedron.

Figure 6:
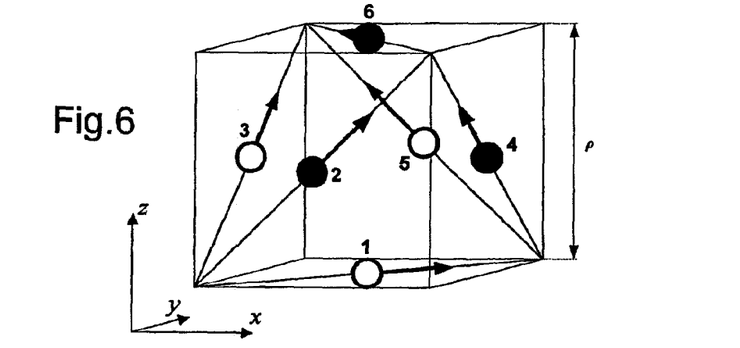
FIG. 6 is a diagram showing the architecture of an angular accelerometer made of six single-axis linear gyros associated in a regular tetrahedron configuration.

In one embodiment, an inertial sensor of the invention may be constituted essentially by a conventional AHRS together with three linear accelerometers for measuring angular acceleration (giving a total of nine accelerometers); in another embodiment, the sensor of the invention may have three gyros mounted in a trihedron and six linear accelerometers disposed in a symmetrical configuration such as that shown in FIG. 6.

A cluster 30 (as shown in FIGS. 5 and 6) of six linear accelerometers serves not only to measure the three components of angular acceleration $\dot{\vec{\omega}}_m$, but also the three components of linear acceleration $\vec{\gamma}_m$; this data is output from a matrix calculation module 32 that receives as input the signals from the six linear accelerometers; this module also receiving the previously-estimated angular velocity in order to correct the linear acceleration of centripetal interfering terms.

This data is applied as input to a calculation module 33 that calculates the roll, pitch, and heading angles, and also the altitude and the speed of the aircraft (delivered as outputs 35, cf. FIG. 5) on the basis of a virtual strap-down platform algorithm and as a function of said data, of velocity and altitude assistance signals 34, and of signals taken from a magnetometer.

The (measured) linear acceleration components $\vec{\gamma}_m$, (measured) angular acceleration components $\dot{\vec{\omega}}_m$, and (estimated) angular velocity components $\hat{\vec{\omega}}$ are delivered to the autopilot. The hybridizing module 25 also outputs a signal 36 representing detection of a sensor failure, and as described in detail below.

A system of the invention thus makes it possible to reduce the noise level in the angular velocity measurement, and to provide two additional functions: it outputs an angular acceleration measurement as such (which may be used as such as an input to the AP), and it monitors proper operation of certain components of the system: by segregating acquisition and processing firstly of the accelerometer cluster and secondly of the three gyros, two distinct sources are made available for measuring the same angular movements. They can therefore be used to perform mutual surveillance, thereby significantly reducing the rate at which failures occur without being detected.

In a preferred embodiment of the invention, six single-axis linear accelerometers are used that are rigidly associated with one another, being disposed and oriented in a first configuration as shown in FIG. 6, in which:

the sensing point—represented by small disks—of the respective accelerometers referenced 1 to 6 are located at the respective centers of the edges of a regular tetrahedron; and the sensing axes—represented by arrows starting from the disks—of the respective accelerometers referenced 1 to 6 point along said edges.

As described in the above-referenced document "A compensator to advance gyro-free INS precision", in this particular configuration of accelerometers, the relationship between the three angular acceleration components $\dot{\vec{\omega}}$ and the six linear acceleration measurements $\gamma_1, \gamma_2, \ldots \gamma_6$ can be written in the following forms:

$$\dot{\vec{\omega}} = \frac{1}{2\sqrt{2}\rho} \begin{bmatrix} 1 & -1 & 0 & 0 & 1 & -1 \\ -1 & 0 & 1 & -1 & 0 & -1 \\ 0 & 1 & -1 & -1 & 1 & 0 \end{bmatrix} \begin{bmatrix} \gamma_1 \\ \gamma_2 \\ \gamma_3 \\ \gamma_4 \\ \gamma_5 \\ \gamma_6 \end{bmatrix}$$

In this form, $\rho$ is the length of the edge of a cube in which the tetrahedron is inscribed, the edges of the tetrahedron corresponding respectively to the diagonals of the faces of the cube.

Thus, for the cluster of six accelerometers mounted as a regular tetrahedron, one angular acceleration component is the sum of four linear accelerations divided by $2\sqrt{2}\rho$. If the linear acceleration noise is $\tilde{\gamma}$, then the angular acceleration noise is given by:

$$\tilde{\dot{\omega}} = \sqrt{4}\frac{\tilde{\gamma}}{2\sqrt{2}\rho} = \frac{1}{\sqrt{2}\rho}\tilde{\gamma}$$

MEMS accelerometers generally present noise that is white (i.e. substantially constant PSD for the frequencies used). The angular acceleration noise is therefore likewise white.

In contrast, the angular velocity noise PSD affecting a MEMS gyro depends on the technology used. Open-loop sensors present white noise, whereas servo-controlled sensors present PSD that is proportional to frequency.

With a miniature gyro presenting white noise, writing $\tilde{\dot{\omega}}$ for the spectrum density of the angular acceleration measurement noise and $\tilde{\omega}$ for the spectrum density of the angular velocity noise coming from the gyro, the frequency corresponding to the point of intersection of the noise density spectra respectively from the "gyro" angular velocities and the "accelerometer" angular velocities is given by:

$$f_i = \frac{1}{2\pi} \frac{\tilde{\dot{\omega}}}{\tilde{\omega}}$$

The order of magnitude of this frequency may be a few millihertz. Assuming that these two kinds of white noise are the only sources of error, the optimum filter is a first-order filter; the transfer function H(p) of FIG. 3 is no more than a mere gain K=1/t.

The overall transfer function of the filter and hybridizing system shown in FIG. 3 is given by:

$$\hat{\omega} = \begin{pmatrix} \frac{\tau p}{1+\tau p} & \frac{1}{1+\tau p} \end{pmatrix} \begin{pmatrix} \frac{\dot{\omega}}{p} \\ \vec{\omega} \end{pmatrix} = \frac{\tau \vec{\dot{\omega}} + \vec{\omega}}{1+\tau p}$$

It is easy to verify that the optimum value for τ, i.e. the value that minimizes the amplitude of the noise $\tilde{\hat{\omega}}$ affecting the hybrid angular velocity can be determined using the following formula:

$$\tau = \frac{\tilde{\omega}}{\tilde{\dot{\omega}}}$$

The optimum cutoff frequency for the hybridizing filter (f=½πτ) coincides with the frequency at which the noise spectra intersect.

Figure 8:
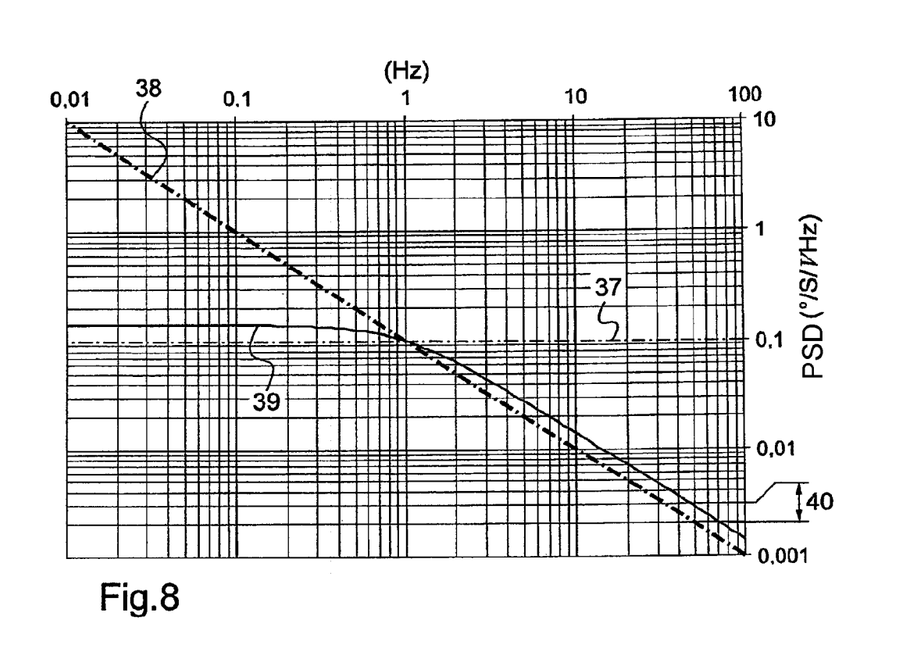
FIG. 8 is a diagram showing the appearance of the variation, as a function of frequency, in the PSD of the noise respectively in a gyro and in the time integral of the signal from an angular accelerometer, together with the noise that results from hybridizing the measurements from these two sensors.

FIG. 8 shows in greater detail, in superposition, the respective noise spectra of the two inputs and of the outputs of the filter: the noise 37 of an OL-MEMS gyro, the integral 38 of the noise of a MEMS angular accelerometer, and the resulting hybrid noise 39.

If it is desired to give precedence to high frequencies (to the detriment of flow frequencies), then it is possible to adopt a lower cutoff frequency, so that the asymptote of the high frequency noise approaches that of the integrated angular accelerometer; with an optimum adjustment it is situated 3 decibels (dB) higher (reference 40).

Figure 9:
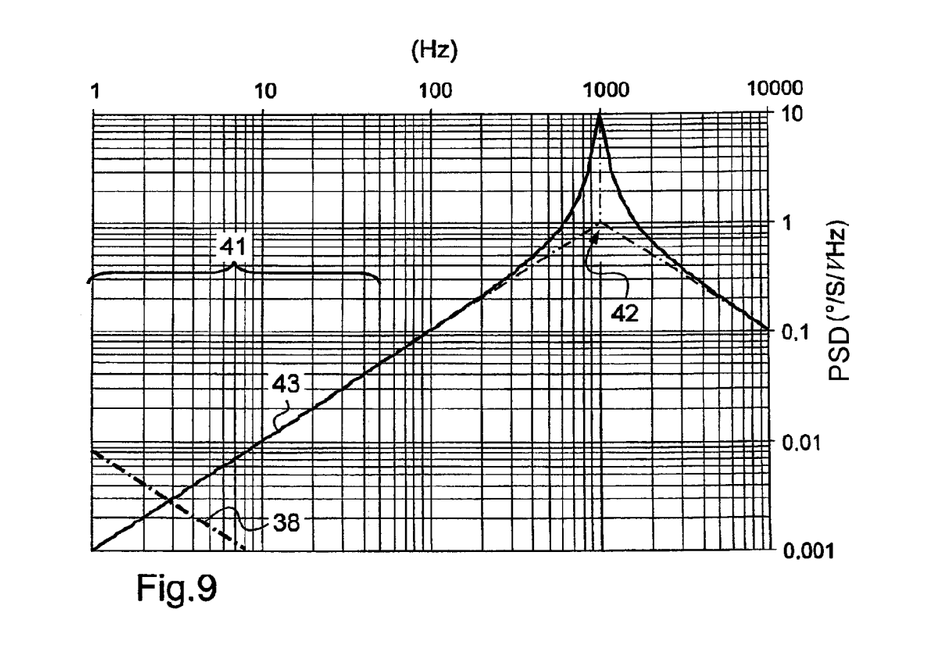
FIG. 9 is a diagram showing the appearance of the variation, as a function of frequency, in the PSD of the noise respectively in a servo-controlled gyro and in the integral of an accelerometer signal.

For a servo-controlled miniature gyro presenting "f" noise, i.e. presenting a noise spectrum that increases substantially proportionally with frequency (possibly from a determined frequency that is generally much lower than 1 Hz), the gyro noise is white noise filtered by a second-order bandpass filter presenting a high Q factor. The noise spectrum 43 presents a peak (maximum) at the resonant frequency 42 of the gyro, as shown in FIG. 9.

In the frequency range 41 of interest, in particular for frequencies less than or equal to 100 Hz, it can be considered that the noise from the gyro is constituted by white noise θ̇ "colored" by a differentiating filter.

In the useful frequency range, in particular in the frequency range about 0.01 Hz to about 10 Hz, the noise present therefore comprises uniform angular acceleration noise (white noise) together with "f" gyro noise. The hybridizing filter therefore needs to behave like a first second-order highpass filter for the gyro, so that it presents decreasing "1/f" residual high frequency noise, and as a second-order highpass filter for the angular accelerometer, so that it presents "f" residual low frequency noise tending to 0.

These two requirements that can be achieved by means of a third-order filter corresponding to the following transfer function:

$$\hat{\omega} = \begin{pmatrix} \frac{bp^2 + cp^3}{1+ap+bp^2+cp^3} & \frac{1+ap}{1+ap+bp^2+cp^3} \end{pmatrix} \begin{pmatrix} \frac{\dot{\omega}}{p} \\ \vec{\omega} \end{pmatrix}$$

Figure 10:
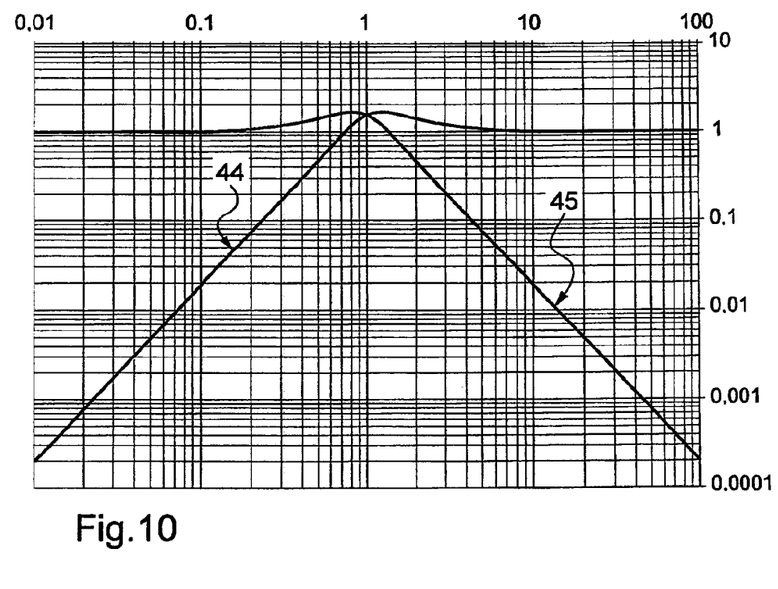
FIG. 10 is a diagram showing the variation, as a function of frequency, of the weighting of the signals coming respectively from a gyro and from the time integral of an accelerometer by means of a third-order filter in a hybridizing system of the invention.
Figure 11:
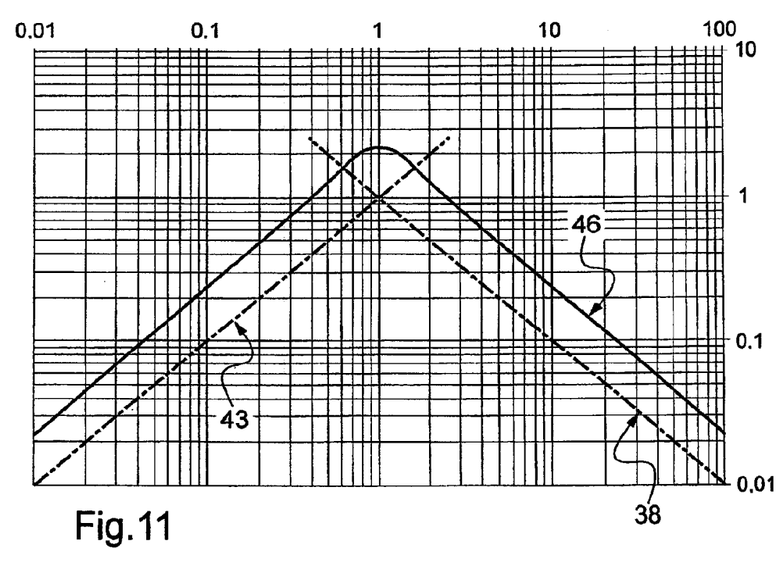
FIG. 11 is a diagram showing the appearance of the variation, as a function of frequency, in the PSD of the noise respectively in a gyro and in the integral of an accelerometer, together with the noise that results from hybridizing the measurements from these two sensors by the filter having the characteristics shown in FIG. 10.

FIGS. 10 and 11 show the characteristics and the performance of such filters drawn up for values of a, b, and c such that the common denominator in the two terms of the transfer function is of the second-order Butterworth type, of the form $(1+\tau p)^3$, with $\tau=1/2\pi f_c$ and with $f_c=1$ Hz.

FIG. 10 shows the weighting curves corresponding to the moduluses of the two transfer functions 44 and 45 respectively of said first and second filters that stop respectively low frequencies and high frequencies (like second-order filters).

FIG. 11 shows in greater detail the spectra 38 and 43 of the two noise sources (integrated angular accelerometer and gyro) together with the spectrum 46 of the hybrid noise that results from the filtering.

It can be seen in FIG. 11 that the hybrid noise density is 6 dB above that of the integral of the angular accelerometer.

Figure 12:
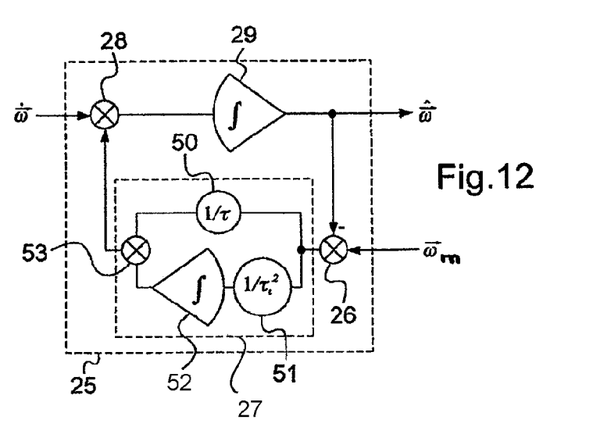
FIG. 12 is a block diagram of another embodiment of a hybridizing filter of the system of the invention.

Since most linear accelerometers are affected by bias, the measured angular acceleration is likewise biased, thereby disturbing the estimated angular velocity when using the above-described first-order filter. It is therefore desirable under such circumstances to add an integral effect in the feedback loop, as shown in FIG. 12.

The filter 27 then comprises a first branch comprising an amplifier 50 of gain equal to 1/τ, and a second branch comprising an integrator 51, 52 with integral gain equal to 1/τi. These two branches are connected in parallel between the output from the subtractor 26 for calculating the innovation, and the input to a summing circuit 53 whose output is connected to the input of the summing circuit 28.

It is generally possible to conserve the above-defined gain value 1/τ. It is preferable to select an integral gain (1/τi) having a value that is small (τi>>τ), but sufficient to track slow fluctuations in accelerometer bias. In other words, it is necessary to adopt a high damping coefficient in this second-order loop.

The above-described third-order filter behaves like a second-order highpass filter for the integrated angular acceleration. The combination of the second order and the operation of integration produces first-order low frequency behavior for angular acceleration measurements. The bias is thus rejected by this filter.

An advantage of the invention is that it makes two independent sources available for measuring angular movements. Monitoring consistency between these two sources thus makes it possible to detect a failure of one of them, and to reduce considerably the rate at which dangerous failures occur.

Thus, it is possible to provide an autopilot that has only one AHRS in accordance with the invention, with this mere detection of failure (i.e. without locating it) making it possible at least to passivate the failure (i.e. freeze the actuators) and warn the pilot of the aircraft. Such a system is therefore passive after a failure ("fail passive"), whereas conventional systems require a second inertial sensor.

In a dual system having two AHRSes in accordance with the invention, there is no need to have a third source in order to be able, in the event of a failure, to determine which one of the two has failed, since each of the two AHRSes itself detects it own failures. It is then possible to devise a system that continues to be operational after a failure (fail operative) based on only two AHRSes in accordance with the invention whereas conventional systems require a third inertial sensor.

In order to detect failure, it is preferable to use a surveillance technique that processes the "innovation" (i.e. the signal representing the difference between the estimate and the measurement). In the absence of a failure, this signal is close to white noise with a zero mean value. In the presence of a failure, a bias is seen to appear (either instantaneous if the failure relates to a gyro and appears as an error step change, or progressively if the failure relates to an accelerometer).

Since the amplitude of the white noise that is expected in the absence of a failure is known (it is a characteristic of the gyro), it is possible to compare the innovation with a threshold (in fact two symmetrical thresholds, one positive and the other negative), and to indicate that a failure has occurred when the threshold is crossed.

Figure 14:
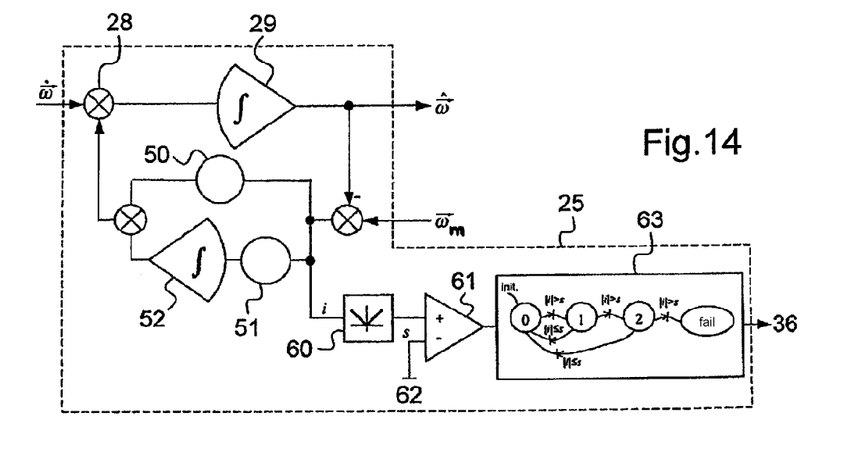
FIG. 14 is a block diagram of a hybridizing system of the invention incorporating failure surveillance means.

This processing can be performed by a module 60 that calculates the absolute value of the innovation monitored at the outlet from the subtractor 26 of the filter 25, and delivering the absolute value as an input to a comparator 61 having its second input connected to a reference value 62 corresponding to the detection threshold, as shown in FIG. 14.

In order to optimize the compromise between accuracy of surveillance and the rate at which false detections occur, it is possible to act on the following two parameters:

i) threshold adjustment: for a determined expected standard deviation, setting the threshold, e.g. to six times the standard deviation, leads to a false detection rate of the order of $3 \times 10^{-9}$, i.e. three false detections per billion samples; and ii) confirming the failure over a plurality of samples: a sequential logic system is inserted between the output from the threshold comparator and the signal indicating the failure. The logic system is designed so that the failure is not considered as being confirmed unless the threshold has been exceeded for several successive cycles. For example, the threshold may be set to four times the standard deviation, leading to a probability of $10^{-4}$ of the threshold being exceeded on each sample, and then to a probability of it being exceeded during three successive cycles of 10-12.

The hybridizing filter of a device in accordance with the invention is thus advantageously associated with a threshold comparator and with a logic circuit 63 for confirming failure, thus making it possible to increase the coverage ratio of the incorporated test, as shown in FIG. 14.

Most gyros are included in an inertial measurement unit (IMU) that measures the three components of the rotation vector, and also the three components of the acceleration vector. When the angular accelerometer is made using a cluster of linear accelerometers, it is also possible to provide an estimate of the linear acceleration at a point.

In the embodiment where the redundant cluster is configured as a tetrahedron, the linear acceleration at the center of the tetrahedron can be calculated in the manner described in the above-mentioned document "A compensator to advance gyro-free INS precision":

$$\vec{\gamma}_0 = \frac{1}{2\sqrt{2}} \begin{bmatrix} 1 & 1 & 0 & 0 & -1 & -1 \\ 1 & 0 & 1 & -1 & 0 & 1 \\ 0 & 1 & 1 & 1 & 1 & 0 \end{bmatrix} \begin{bmatrix} \gamma_1 \\ \gamma_2 \\ \gamma_3 \\ \gamma_4 \\ \gamma_5 \\ \gamma_6 \end{bmatrix} + \rho \begin{bmatrix} \omega_y \omega_z \\ \omega_z \omega_x \\ \omega_x \omega_y \end{bmatrix}$$

By ignoring centripetal acceleration terms, the system of equations is overdetermined (six linear accelerometers for measuring three acceleration components), and it can be solved simply by a least-squares method, corresponding to the left-hand term of the above expression. Because of the excess number of accelerometers, it is possible to detect an accelerometer failure, e.g. by comparing the least squares residue with a threshold.

The right-hand term of the above expression corrects the effects of centripetal acceleration that appear as a result of the accelerometers not all coinciding at a single point. To minimize noise, the angular velocity components used may advantageously be the hybrid estimates. For an embodiment of small size ($\rho$ close to 10 centimeters (cm), for example), this term may possibly be ignored.

By using an angular accelerometer that presents white noise, it is thus possible, for any noise profile of the gyro, to obtain a high frequency asymptote for "1/f" hybrid noise. Whatever the shape of the PSD at low frequencies, it can be bounded by a function of the "first-order lowpass type":

$$\frac{\tilde{\omega}_0^2}{1 + \left(\frac{f}{f_0}\right)^2}$$

Unlike white noise, or a fortiori "f" noise, such noise presents "finite power" that is completely localized in low frequencies. Above a certain threshold, increasing the resonant frequency of the "AP+aircraft" loop has no more influence on the amplitude of the sensor noise transmitted to the aircraft. In an autopilot system in accordance with the invention, it is therefore possible to envisage an open loop gain that is as high as desired, and that is limited only by closed loop stability problems.

The advantage of high frequency lowpass filtering of noise by means of an angular accelerometer presenting white noise is particularly important for MEMS gyros, those of the type having a resonant structure to which the invention is easily applied. The invention can also be used with other types of gyros, such as FOGs, even if their intrinsic noise is low, thereby further reducing high frequency noise and enabling the gain of the piloting loop to be further increased, and thus improving the quality of the autopilot.

Figure 7:
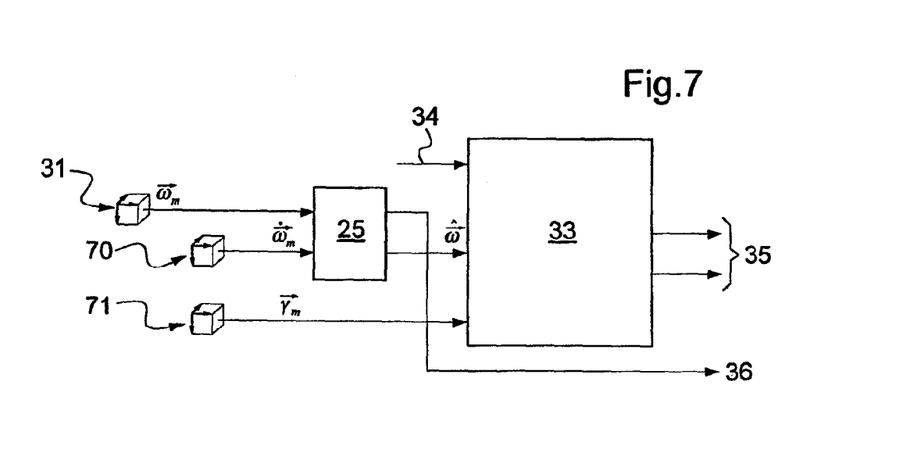
FIG. 7 is a block diagram of another embodiment of a system of the invention.

With reference to FIG. 7 in particular, in another embodiment of the invention, the system comprises three MEMS angular accelerometers disposed in a trihedron 70 that measure the angular acceleration of the carrier directly, three gyros 31, and three linear accelerometers 71 in a trihedron; the signals delivered by these sensors are input to the hybridizing modules 25 and to the virtual platform calculation module 33.

Figure 13:
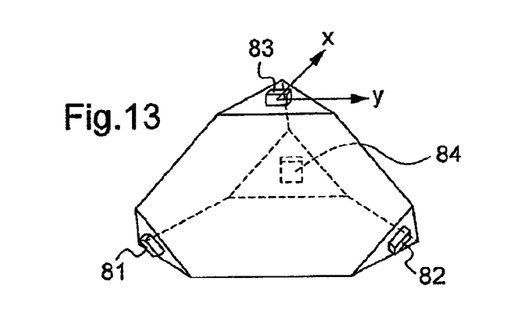
FIG. 13 is a diagram showing the architecture of an angular accelerometer made up of four two-axis linear accelerometers in another regular configuration based on a tetrahedron.

In the variant embodiment shown in FIG. 13, four identical MEMS accelerometers 81 to 84 are secured to one another at the vertices of a regular tetrahedron in a configuration presenting central symmetry; each accelerometer presents two mutually orthogonal sensitivity axes (such as those referenced x and y), and it delivers two corresponding (axial) linear acceleration signals.

A simple matrix product enables the three angular acceleration components to be calculated as a function of the eight "scalar" measurements of acceleration as delivered by these four two-axis sensors.

What is claimed is:

1. A system for determining an angular velocity of an aircraft comprising:
   at least one gyro configured to deliver measured angular velocity signals affected by stochastic noise;

at least one accelerometer configured to deliver angular acceleration signals of the aircraft; and a hybridizing module coupled to the at least one gyro and to the at least one accelerometer configured to hybridize and to filter completely in the frequency domain, the hybridizing module including:

a subtractor configured to receive the measured angular velocity signal and a previously-estimated angular velocity;

a filter connected to the subtractor configured to receive as input a difference between the angular velocity sign and the hybrid estimated angular velocity signal produced by the subtractor and configured to deliver as output a bias correction;

a summing circuit connected to the filter and configured to receive as input the output of the filter and the angular acceleration signals of the aircraft; and an integrator connected to the summing circuit and configured to receive as input a sum from the summing circuit and to deliver as output a hybrid estimated angular velocity having reduced stochastic noise.

2. The system as recited in claim 1, wherein the system is configured to measure the angular velocity using at least one gyro configured to deliver a measured angular velocity signal affected by stochastic noise, measure the angular acceleration of the aircraft using at least one accelerometer configured to deliver a signal representing the angular acceleration of the aircraft; and use a filtering complementary in a frequency domain to combine a sum of the measured angular velocity signal and the angular acceleration signal so as to obtain a hybrid estimated angular velocity signal with reduced stochastic noise, wherein the hybridizing module is configured to perform complementary filtering and includes a lowpass filter characteristic for the gyro signals and a highpass filter characteristic for the accelerometer signals.

3. The system as recited in claim 1, wherein the at least one gyro is configured to produce a noise of power spectrum density (PSD) that is substantially uniform in a frequency band from about 0.1 Hz to about 10 Hz.

4. The system as recited in claim 1, wherein the at least one gyro is configured to produce a noise of power density (PSD) that is substantially proportional to frequency in a frequency band from about 1 Hz to about 10 Hz.

5. The system as recited in claim 1, wherein the at least one accelerometer is configured to produce a noise of power spectrum (PSD) that is substantially uniform regardless of frequency in a frequency band from about 0.1 Hz to about 10 Hz.

6. The system as recited in claim 1, wherein the at least one accelerometer includes at least six linear accelerometers.

7. The system as recited in claim 1, wherein the at least six linear accelerometers are secured rigidly to one another in a configuration having central symmetry.

8. The system as recited in claim 1, wherein the at least one accelerometer includes at least six single-axis linear accelerometers disposed in a configuration, the at least six single-axis linear accelerometers each including a sensitive point and a sensitivity axis, wherein each sensitive point is disposed in a center of an edge of a regular tetrahedron and each the sensitivity axis is oriented along the edge.

9. The system as recited in claim 1, wherein the at least one accelerometer includes at least four two-axis linear accelerometers each disposed at a vertex of a tetrahedron.

10. The system as recited in claim 1, wherein the at least one accelerometer includes at least three linear accelerometers disposed in a trihedron configuration and at least three angular accelerometers disposed in a trihedron configuration.

11. The system as recited in claim 1, wherein the at least one gyro includes a microelectromechanical system (MEMS).

12. The system as recited in claim 1, wherein the at least one accelerometer includes a microelectromechanical system (MEMS).

13. The system as recited in claim 1, wherein the filter includes a proportional gain $1/\tau$, a low integral gain $1/\tau i$, where $\tau \ll \tau i$, and a cutoff frequency of less than 1 Hz.

14. The system as recited in claim 1, includes a comparator configured to compare difference between the angular velocity signal and the hybrid estimated angular velocity signal with a threshold and a failure-confirmation logic circuit connected to the comparator.

* * * * *